US012394276B2

(12) United States Patent
Kaneko et al.

(10) Patent No.: US 12,394,276 B2
(45) Date of Patent: Aug. 19, 2025

(54) GAME TABLE AND CHIP INFORMATION MANAGEMENT METHOD FOR GAME TABLE

(71) Applicant: SEGA SAMMY CREATION INC., Tokyo (JP)

(72) Inventors: Makoto Kaneko, Tokyo (JP); Yuji Shimada, Tokyo (JP)

(73) Assignee: SEGA SAMMY CREATION INC., Tokyo (JP)

( * ) Notice: Subject to any disclaimer, the term of this patent is extended or adjusted under 35 U.S.C. 154(b) by 520 days.

(21) Appl. No.: 17/914,144

(22) PCT Filed: Mar. 25, 2020

(86) PCT No.: PCT/JP2020/013258
§ 371 (c)(1),
(2) Date: Mar. 21, 2023

(87) PCT Pub. No.: WO2021/192076
PCT Pub. Date: Sep. 30, 2021

(65) Prior Publication Data

US 2023/0237869 A1 Jul. 27, 2023

(51) Int. Cl.
*G07F 17/32* (2006.01)

(52) U.S. Cl.
CPC ........ *G07F 17/322* (2013.01); *G07F 17/3241* (2013.01); *G07F 17/3248* (2013.01)

(58) Field of Classification Search
CPC ............... G07F 17/322; G07F 17/3241; G07F 17/3248; G07F 17/3232; G07F 17/3234; G07F 17/32; G07F 17/3293; A63F 1/06
(Continued)

(56) References Cited

U.S. PATENT DOCUMENTS

2010/0240446 A1 9/2010 Koyama et al.
2014/0073415 A1* 3/2014 Sammon ................ A63F 13/00
463/25

(Continued)

FOREIGN PATENT DOCUMENTS

JP 2005-342175 A 12/2005
JP 2010-213940 A 9/2010

(Continued)

OTHER PUBLICATIONS

International Search Report issued in PCT Patent Application No. PCT/JP2020/013258, Jun. 16, 2020, with English language translation, 5 pages.

*Primary Examiner* — Pierre E Elisca
(74) *Attorney, Agent, or Firm* — Faegre Drinker Biddle & Reath LLP

(57) ABSTRACT

A game table is provided in which a dealer can suppress an unauthorized use of a chip without taking time and effort to confirm a validity of a chip. The game table includes a plurality of betting areas for placing chips, a reading device that reads identification information that specifies the chip placed on the betting area, and a computer device that updates management information including a validity of the chip based on the identification information read from the chip, in which the computer device executes a functions of managing a progress of a game and updating the management information so as to validate a status of the chip placed on the betting area that won the game, invalidating a status of the other chips during a dividend period in which a dividend amount according to a result of the game is paid.

6 Claims, 6 Drawing Sheets

(58) Field of Classification Search
USPC .......................................................... 463/25
See application file for complete search history.

(56) References Cited

U.S. PATENT DOCUMENTS

| | | | | |
|---|---|---|---|---|
| 2018/0357850 | A1* | 12/2018 | Moore | G07F 17/3211 |
| 2019/0066438 | A1 | 2/2019 | Yamaguchi et al. | |

FOREIGN PATENT DOCUMENTS

| | | | |
|---|---|---|---|
| JP | 2014-087692 | A | 5/2014 |
| JP | 2015-061696 | A | 4/2015 |
| JP | 2015-157113 | A | 9/2015 |
| JP | 2015-157114 | A | 9/2015 |
| JP | 2019-040334 | A | 3/2019 |

* cited by examiner

GAME TABLE AND CHIP INFORMATION MANAGEMENT METHOD FOR GAME TABLE

CROSS-REFERENCE TO RELATED APPLICATIONS

This application is the U.S. national phase of the International Patent Application No. PCT/JP2020/013258, filed Mar. 25, 2020, the entire content of which is incorporated herein by reference.

TECHNICAL FIELD

The present disclosure relates to a game table and a chip information management method for a game table.

BACKGROUND

In recent years, a game table using a chip in which identification information is electronically recorded has been developed. For example, a system is disclosed in which a casino chip is not managed as a security but is linked to the identification information of the casino chip to manage a bond on a server (see, for example, Japanese Patent Application Laid-Open No. 2010-213940, Japanese Patent Application Laid-Open No. 2014-87692, Japanese Patent Application Laid-Open No. 2015-157113, and Japanese Patent Application Laid-Open No. 2015-157114). Such a system makes it possible to handle from cash basis accounting to accrual basis accounting.

However, in the prior art, a dealer has to perform a process of validating or invalidating the chip placed on a betting area each time a result of a game is known. In addition, since the validated chip is in a cashable state, there is a possibility that a player may cheat.

SUMMARY

Aspects of the present disclosure provide a game table in which a dealer can suppress an unauthorized use of the chip without taking time and effort to validate the chip.

A game table according to an embodiment is a game table including a plurality of betting areas for placing chips, the game table including a reading device that reads identification information that specifies the chip placed on the betting area; and a computer device that updates management information including a validity of the chip based on the identification information read from the chip, in which the computer device executes a function of managing a progress of a game, and a function of updating the management information so as to validate a status of a chip placed on a betting area that won the game, and invalidate a status of the other chips during a dividend period in which a dividend amount according to a result of the game is paid.

According to this embodiment, the chip placed on the winning betting area is automatically validated after the result of the game is determined, so that the dealer does not have to take time and effort to validate the chip and an unauthorized use of the chip can be suppressed.

BRIEF DESCRIPTION OF THE DRAWINGS

Various embodiments are illustrated in the drawings, in which.

DETAILED DESCRIPTION

Figure 1:
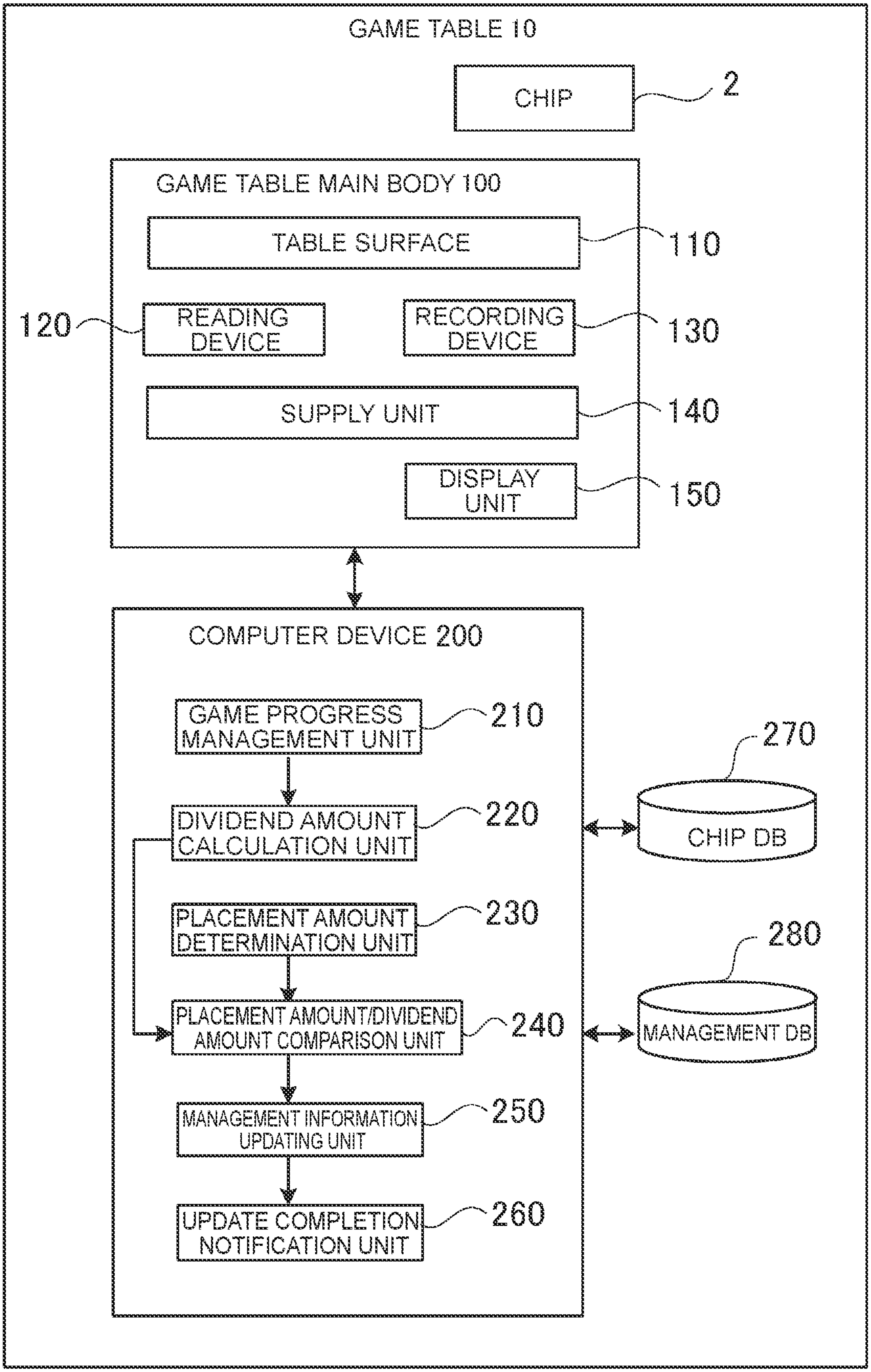
FIG. 1 is a block diagram illustrating an example of a configuration of a game table according to an embodiment.

Below, preferred embodiments of the present disclosure are described with reference to the drawings. In each drawing, those having the same reference numerals have the same or similar configurations.

Explanation of Terms

In the present specification, terms are defined as follows.

"Game table": a table on which various games are played in a game hall. Generally, one dealer is assigned to each table. In addition, a plurality of users can participate in the game at the same time for one table.

"Dealer": a person on a game hall side who controls a progress of the game, such as dealing cards used in the game.

"User": a guest person who visits the game hall and participates in the game.

"Baccarat": a traditional card game in which the user predicts and bets win or loss in the card game between BANKER (role of a gambling owner) and PLAYER (role of a guest). The user simply predicts the win or loss of the game, and because of its ease of use, it is gaining popularity in the game hall around the world. The dealer deals two or three playing cards to each of the banker and the player according to a certain rule, and the one whose total score is close to "9" wins.

"Chip": a token used by the user to express an expectation. One "chip" has a certain amount of credits or points.

"Bet": the user expresses the expectation and bets, specifically, places the chip in an expected place in the betting area. For example, in baccarat, it means to bet on the win or loss expectation by predicting whether the banker will win, the player will win, or the game will end in a draw (TIE). Further, for example, in blackjack, the user predicts a possibility of winning by himself/herself and bets according to the win or loss expectation.

"Betting area": an area where the chip is bet on the game table. That is, it is an area where the user bets the chip. For example, in baccarat, an area for betting according to whether the banker wins, the player wins, or the game ends in the draw is clearly indicated on the game table.

"Bet amount": an amount used when betting. Each user can randomly specify the bet amount by placing a desired type and number of chips in the betting area. In a case where the expectation of the user is correct, a dividend is obtained according to the bet amount.

"Credit": a balance held by the user. In a case where the dividend is obtained, the amount of credit will increase, and the expectation is wrong, the amount of credit will decrease.

EMBODIMENTS

First, the configuration of the game table according to the present embodiment is described. The game table according to the present embodiment exemplifies a table for playing a traditional card game which is baccarat.

Structure

FIG. 1 is a block diagram illustrating an example of the configuration of the game table according to the present embodiment. As illustrated in FIG. 1, a game table 10 includes a game table main body 100 and a computer device 200. The computer device 200 is built in the game table main body 100. However, the computer device 200 may be provided physically separated from the game table main body 100 and may be disposed so as to be communicable by wired or wireless connection means.

Game Table Main Body

The game table main body 100 includes a reading device 120, a recording device 130, a supply unit 140, and a display unit 150 under a table surface 110 forming an upper surface of an exterior.

A chip 2 is a token that is temporarily placed on the betting area of the table surface 110 during a betting period of the game in order to express the win or loss of the game expected by the user. In the present embodiment, the chip 2 is configured to be able to read and write identification information and management information. The identification information is unique ID information that specifies each chip 2. The management information is information that defines a status of the chip 2. For example, in the present embodiment, the management information indicates three states of an invalid state, a valid state, and a bet state. The invalid state indicates that the chip 2 is in a non-cashable state. The valid state indicates that the chip 2 is in a cashable state. The bet state indicates that the chip is bet.

Although not illustrated, the chip 2 includes, for example, a configuration capable of short-range wireless communication by electromagnetic waves between the reading device 120 and the recording device 130. In a case where wireless communication is possible by the electromagnetic waves, the chip 2 includes, for example, a configuration as an RF tag including an electromagnetic induction coil, an integrated circuit, a memory, and the like. The chip 2 is configured to be able to charge electric power electromagnetically induced by an electromagnetic wave supplied from the supply unit 140 to be used as a power source. The chip 2 and the game table main body 100 may have a configuration capable of optical communication such as infrared rays. Further, the reading device 120 may include a configuration as a camera and may read data of the chip 2 by capturing an image of the chip.

The chip 2 is in a cashable state by a cashier when the management information is validated. Therefore, it is preferable that the management information is validated when being transferring from the cashier to the user. When the user bets the chip 2, the management information of the chip 2 is in a bet state. In a case where the game is won, the management information of the chip 2 is validated by the recording device 130, and in a case where the game is lost, the management information of the chip 2 is invalidated by the recording device 130. Further, various game information such as a bet amount and a dividend amount are displayed on the display unit 150.

Figure 2:
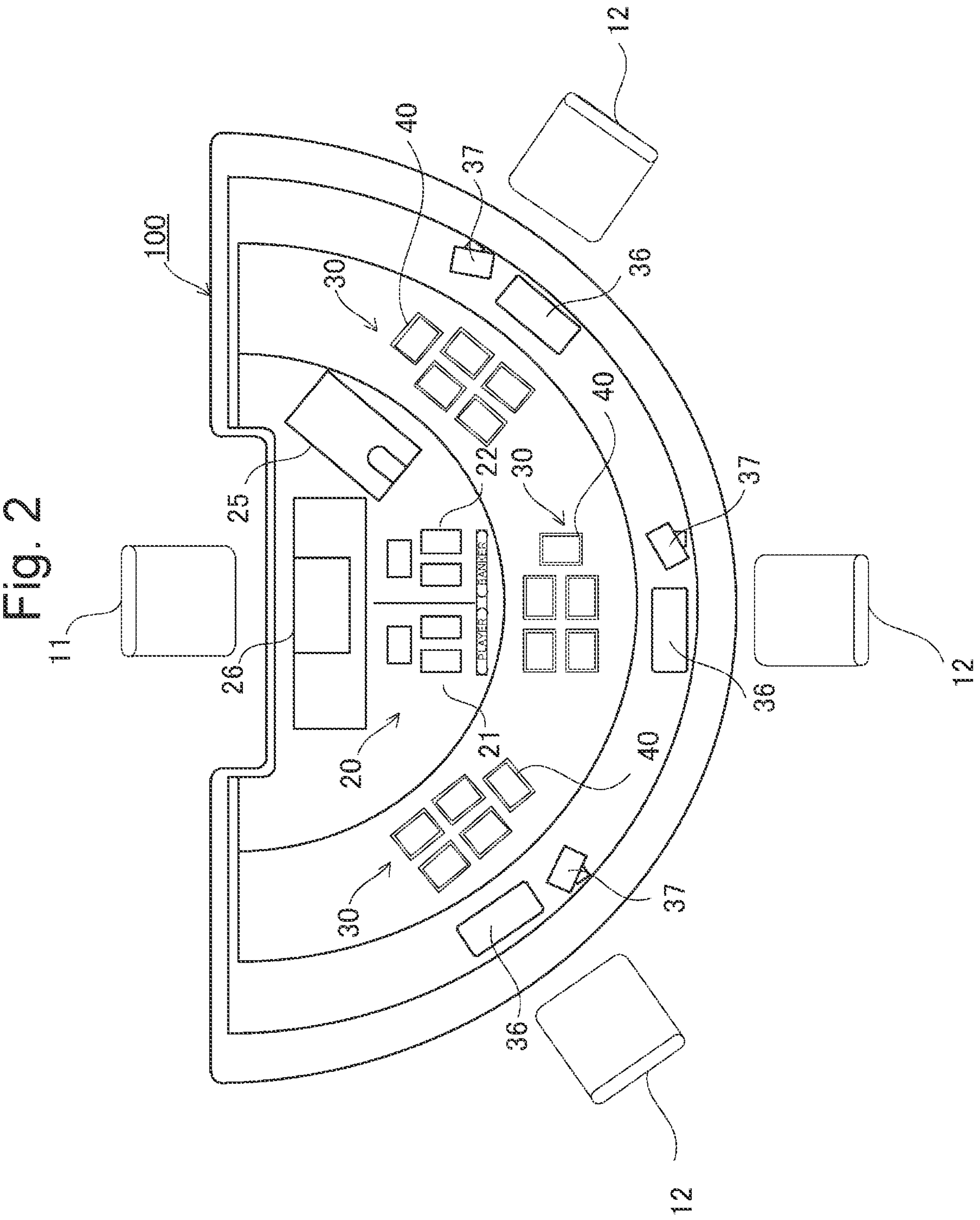
FIG. 2 is a plan view illustrating an example of an upper surface of an appearance of a game table main body according to the embodiment.

FIG. 2 is a plan view illustrating an upper surface of the appearance of the game table according to the present embodiment, that is, an example of the table surface 110. The game table main body 100 is, for example, a semicircular table, and includes one play area 20 and a plurality of betting areas 30. The play area 20 is a region in which the card used by the dealer for the game is placed. The play area 20 is disposed in front of a dealer seating unit 11. The betting area 30 is a region for the user to bet the chip 2 in anticipation of the win or loss of the game. FIG. 2 illustrates a case where three betting areas 30 are disposed on one table surface 110 according to the number of user seating units 12, but the number of betting areas 30 is not limited to three.

A display unit 36 for displaying the progress and the result of the game, and a card reading unit 37 for reading the user card are provided on a user seating unit 12 side of each betting area 30 of the game table 10. The user card is a medium in which the game information of the user is stored, and for example, points acquired as a result of a game so far can be stored. The user can receive various services according to the game information stored in the card. However, contents which are stored in the card do not affect the result of the game.

Figure 3:
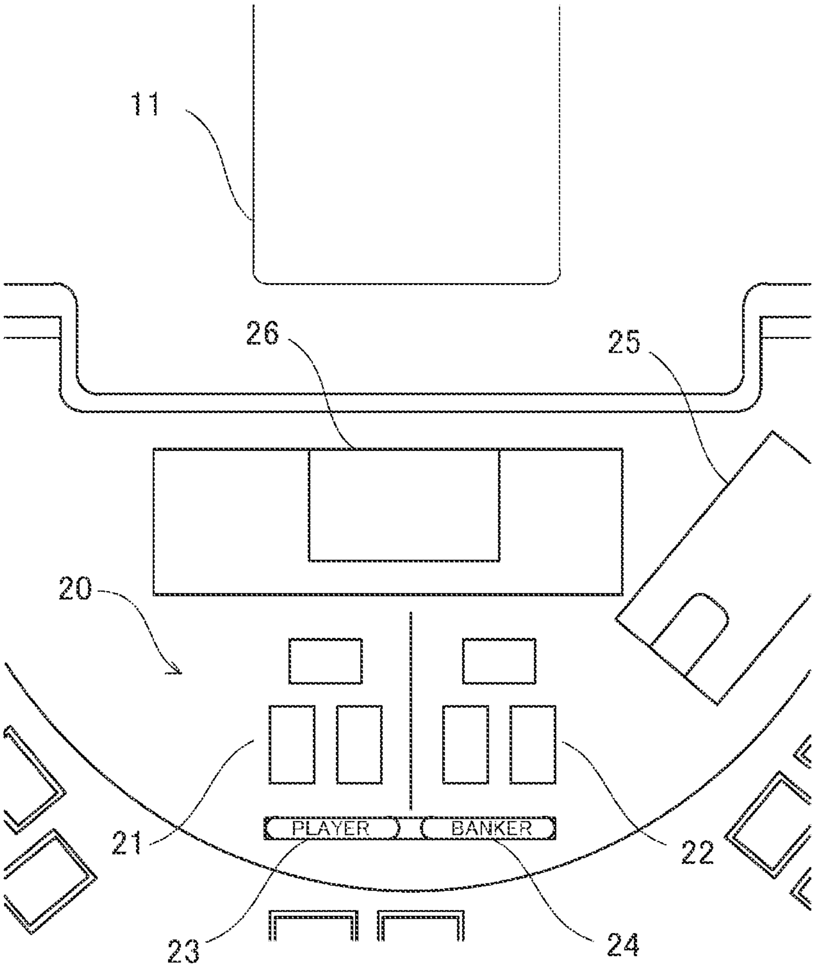
FIG. 3 is an enlarged explanatory view of a play area of the game table main body according to the embodiment.

FIG. 3 is an enlarged explanatory view of the play area 20. As illustrated in FIG. 3, in the play area 20, a player area 21 in which a card on the player side is placed, and a banker area 22 on which a card on the banker side is placed are disposed on the left and right. A player-side instruction lamp 23 is provided in the vicinity of the player area 21. The player-side instruction lamp 23 is turned on at the timing when the card should be placed on the player-side. A banker-side instruction lamp 24 is provided in the vicinity of the banker area 22. The banker-side instruction lamp 24 is turned on at the timing when the card should be placed on the banker side. A card shoe 25 for accommodating cards to be distributed to the player area 21 and the banker area 22 is provided in the vicinity of the play area 20. Between the play area 20 and the dealer seating unit 11, a dividend chip accommodation unit 26 for accommodating chips to be dividend to the user who has won the game is provided.

Figure 4:
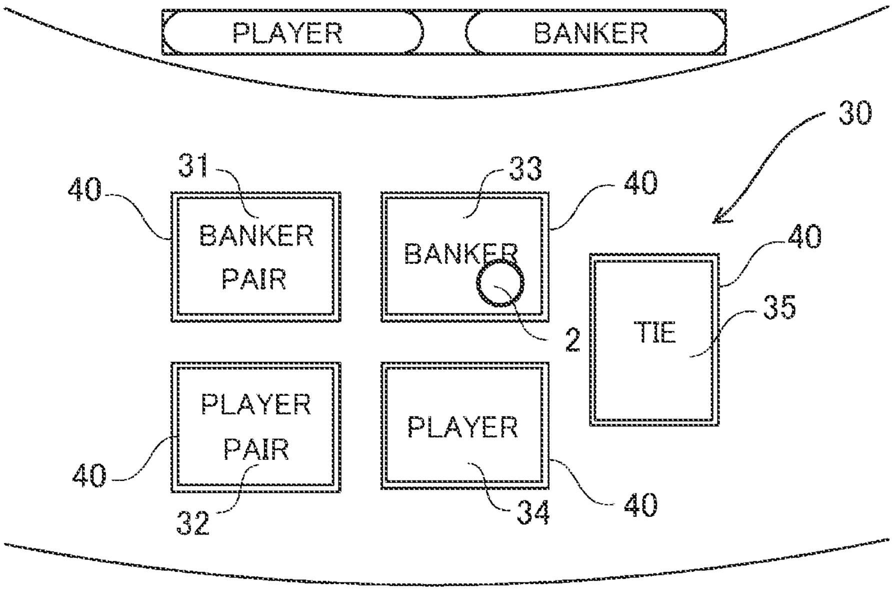
FIG. 4 is an enlarged explanatory view of a betting area of the game table main body according to the embodiment.

FIG. 4 is an enlarged explanatory view of the betting area 30. As illustrated in FIG. 4, in each betting area 30, a sub-area configured of a banker pair area 31, a player pair area 32, a banker area 33, a player area 34, and a tie area 35 is disposed. The banker pair area 31 is a region for betting in a case where a pair is expected to appear on the banker side. The player pair area 32 is a region for betting in a case where a pair is expected to appear on the player side. The banker area 33 is a region for betting in a case where the banker is expected to win. The player area 34 is a region for betting when the player is expected to win. The tie area 35 is a region for betting when the draw is expected. Area identification information for distinguishing from each other is given to the sub-areas 31, 32, 33, 34, and 35 of the betting area 30. A lamp 40 is provided around each sub-area. The lamp 40 can emit light in a plurality of colors so that a progress situation of the game can be visually notified to the user and the dealer.

Returning to FIG. 1, the reading device 120 is provided in association with the betting area 30, and has a function of wirelessly communicating with the chip 2 placed on the betting area 30 to read the identification information and the management information of the chip 2. When reading the identification information and the management information from the chip 2, each reading device 120 outputs the identification information and the identification information together with the identification information for specifying the betting area 30 associated therewith to the computer device 200. Each recording device 130 is provided in association with the betting area 30, and has a function of wirelessly communicating with the chip 2 placed on the betting area 30 to rewrite the management information of the chip 2. That is, the recording device 130 can make the management information of the chip 2 be in the valid state, the invalid state, or the bet state. Although the reading device 120 and the recording device 130 are exemplified as separate configurations in the present embodiment, the reading device 120 and the recording device 130 may be provided in the same device.

Computer Device

The computer device 200 includes a game progress management unit 210, a dividend amount calculation unit 220, a placement amount determination unit 230, a placement amount/dividend amount comparison unit 240, a management information updating unit 250, and an update completion notification unit 260, as functional blocks. The computer device 200 is connected to a chip database (DB) 270 and a management database (DB) 280, and can read and write data between these databases. Each functional block of the computer device 200 is realized by the hardware which is described later in FIG. 7 executing a software program for realizing a chip information management method according to the present embodiment.

The chip database 270 is a storage unit that stores information for managing all the chips 2 used in the game. In association with the identification information of each chip 2, the management information indicating the invalid state, the valid state, and bet state, which are described above, and other information, for example, a cashing amount assigned to the chip, history information, and the like are recorded. The management database 280 is a storage unit that stores user identification information, user credit information, and the like. The chip database 270 and the management database 280 may be built in separate storage devices or in the same storage device.

The game progress management unit 210 is a functional block that manages the progress of the game. Specifically, the game progress management unit 210 manages the progress of one game by being divided into three periods of a betting period, a game period, and a dividend period. The betting period is a time zone for the user to expect the win or loss of the game and bet chip 2 on any of the sub-areas 31, 32, 33, 34, or 35 of its own betting area 30. The game period is a time zone in which the betting action by the user is prohibited and the dealer distributes the cards to the player area 21 and the banker area 22 of the play area 20 according to rules of the card game. The dividend period is a time zone in which chips 2 corresponding to the dividend amount calculated according to the win or loss of the game are distributed to the winning user by the dealer from the time when the win or loss of the game is determined by the number of cards which are distributed.

The game progress management unit 210 causes the lamp 40 in each sub-area to emit light in a color indicating that the betting period is in progress so as to encourage the user to bet the chip 2 during the betting period. Then, at the end of the betting period, the lamp 40 is turned off.

In a case where the chip 2 is placed on any of the sub-areas after the end of the betting period, the game progress management unit 210 causes the lamp 40 of the sub-area to emit light in a color indicating an error in order to notify the error. Further, the game progress management unit 210 rewrites the management information of the chip 2 bet on the betting area 30 by the recording device 130 into the bet state. For example, when the chip 2 is bet on the banker area 33 by the user (see FIG. 4), the management information of the chip 2 placed on the banker area 33 is rewritten from the valid state to the bet state.

The game progress management unit 210 reads the number of cards distributed to the play area 20 by a reading device (not illustrated) during the game period, and determines the win or loss of the game. Then, when the win or loss of the game is determined, the game period ends. After that, the game progress management unit 210 determines which of the banker pair area 31, the player pair area 32, the banker area 33, the player area 34, and the tie area 35 is the area corresponding to winning (hereinafter referred to as the "winning area"), and determines which thereof is the area corresponding to losing (hereinafter referred to as "non-winning area"). Then, the management information updating unit 250 causes the lamp 40 in the winning area to emit light in a winning color, and the lamp 40 in the non-winning area to emit light in a losing color.

The dividend amount calculation unit 220 is a functional block that calculates the dividend amount according to the win or loss of the game. That is, in a case where the chip 2 is bet in the winning area, the dividend amount calculation unit 220 calculates a total amount of the chips 2 bet by referring to the chip database 270, and calculates the dividend amount to be dividend to the user who bets the chip 2 from the result of the game.

The dealer confirms which sub-area is the winning area or the non-winning area by the emission color of the lamp 40. If the chip 2 is bet in the winning area, a chip 2 corresponding to the dividend amount calculated by the dividend amount calculation unit 220 is placed together with the chip 2 in the winning area. In addition, all the chips 2 placed on the non-winning area are collected.

Figure 5:
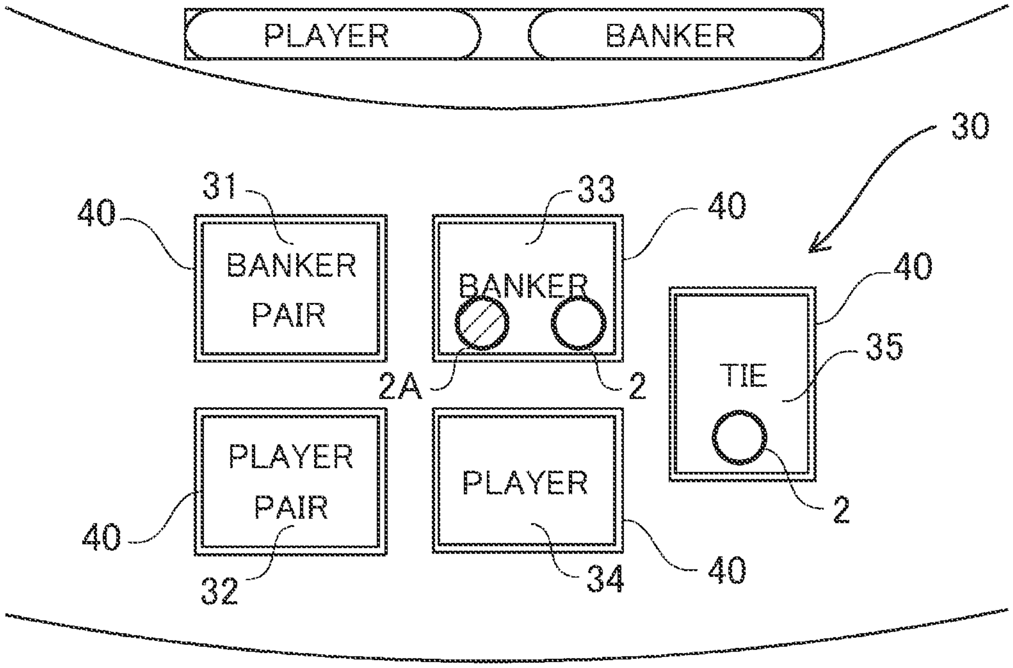
FIG. 5 is an explanatory view illustrating an example of win or loss in the game table of the embodiment.

FIG. 5 is an example of a chip disposition during the dividend period after the win or loss of the game is determined. If the banker wins in a state where the user respectively bets the chips 2 on the banker area 33 and the tie area 35 during the betting period, the banker area 33 becomes the winning area and the other sub-areas become the non-winning area. A chip 2A for the dividend is placed by the dealer on the banker area 33 that has become the winning area. A plurality of chips 2A for the dividend may be stacked so as to be an amount corresponding to the dividend amount.

The placement amount determination unit 230 is a functional block for determining the placement amount of the chips placed on the winning betting area. Specifically, the placement amount determination unit 230 reads the identification information of one or more dividend chips 2A (see FIG. 5) placed on the winning area by the dealer during the dividend period. Then, with reference to the chip database 270, the cashing amount of the chips 2A for the dividend is added to determine the placement amount which is the total amount of the chips 2A which are placed.

The placement amount/dividend amount comparison unit 240 is a functional block that compares the placement amount with the dividend amount, and determines whether the placement amount matches the dividend amount. That is, the placement amount/dividend amount comparison unit 240 compares the placement amount determined by the placement amount determination unit 230 with the dividend amount calculated by the dividend amount calculation unit 220, and determines whether the both match.

The management information updating unit 250 validates the status of the chip 2 placed on the betting area 30 that won the game during the dividend period in which the dividend amount according to the result of the game is paid, and the status of the other chips. It is a functional block that updates the management information so as to invalidate. That is, at the end of the dividend period, the management information updating unit 250 rewrites the management information of the chip 2 placed on the winning area into the valid state by the recording device 130. On the other hand, at the end of the dividend period, the management information of the chip 2 placed on the non-winning area is rewritten to the invalid state by the recording device 130.

Further, the management information updating unit 250 executes a function of updating the status of the chips newly placed on the winning betting area during the dividend period. That is, the management information updating unit 250 rewrites the management information of the chip 2A for dividend placed on the winning area by the dealer into the valid state in a case where the placement amount/dividend amount comparison unit 240 determines that the placement amount matches the dividend amount. In the example of FIG. 5, the management information updating unit 250 rewrites the management information of the chip 2A placed for dividend into the valid state.

The update completion notification unit 260 is a functional block notifying that the update of the management information is completed. That is, the update completion notification unit 260 notifies the dealer and the user of the end of the dividend period at the timing when the management information of the chip 2 is rewritten into the valid state. Various modes of notification can be applied. For example, the lamp 40 of the sub-area that is turned on to indicate the winning area and the non-winning area may be turned off or blinked for a certain period of time.

Chip Information Management Method

Next, a chip information management method according to this embodiment is described. The chip information management method according to the present embodiment is a chip information management method for a game table including a plurality of betting areas for placing chips, the method including a step of reading identification information for specifying the chip placed on the betting area, and a step of updating management information including the validity of the chip based on the identification information read from the chip, in which in the step of updating the management information, during the dividend period in which the dividend amount according to the result of the game is paid, the function of updating the management information so as to validate the status of the chips installed in the betting area that won the game and to invalidate the status of the other chips. Hereinafter, a specific description is given with reference to FIG. 6.

Figure 6:
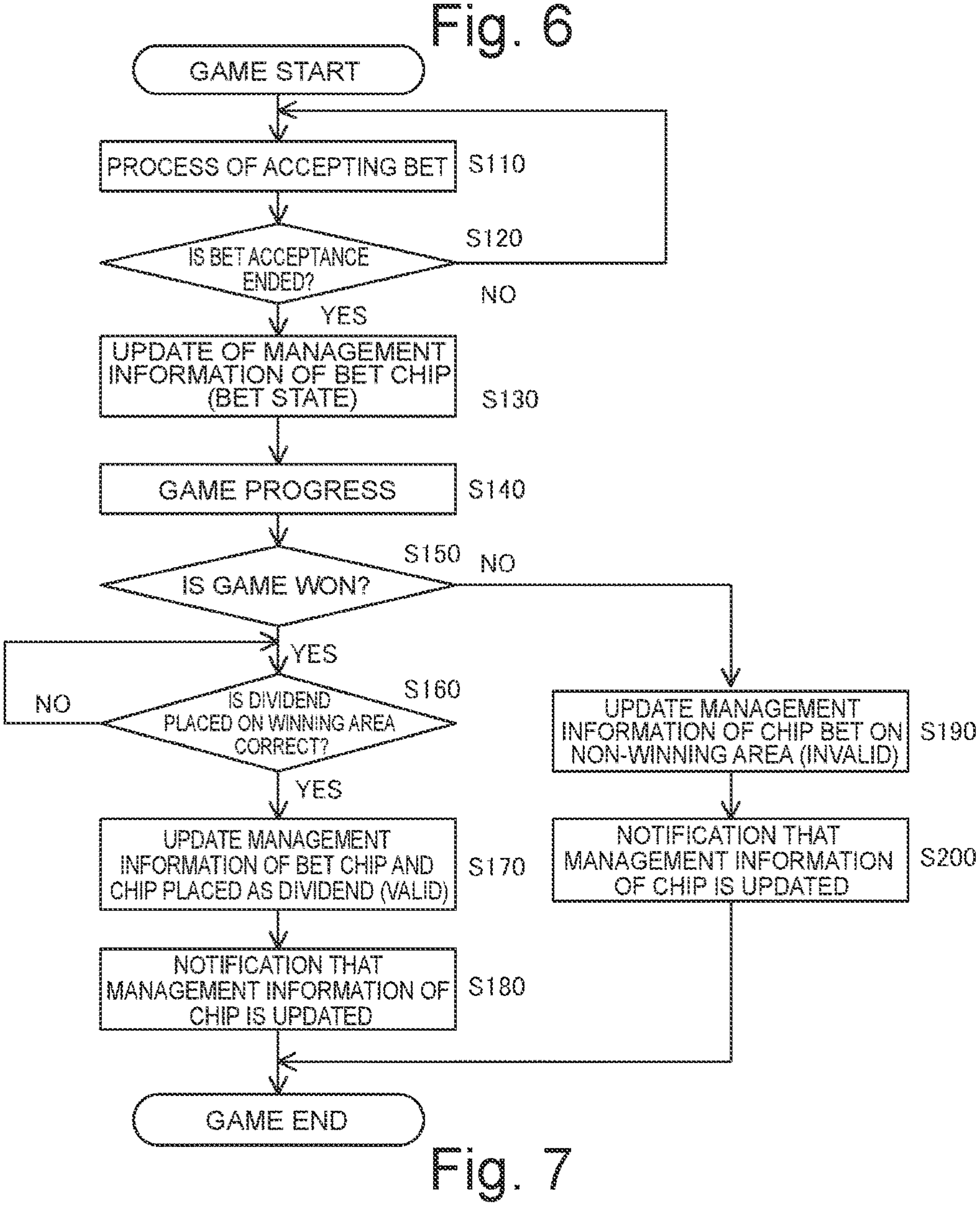
FIG. 6 is a flowchart illustrating a chip information management method for a game table according to an embodiment.

FIG. 6 is a flowchart illustrating the chip information management method of the game table according to the present embodiment. As illustrated in FIG. 6, when the game is started, first, as a process of the betting period, the game progress management unit 210 starts a process of accepting a bet by the user in the betting area 30 (S110). When the betting period starts, the display unit 36 of the table surface 110 indicates that betting is possible. The dealer takes out the cards one by one from the card shoe 25 (FIG. 2) and distributes the cards in order to the corresponding parts (FIG. 3) of the player area 21 and the banker area 22 of the play area 20. During the betting period, the user expects the win or loss of the game and bets the chip 2 in the sub-area corresponding to the expected game result in the betting area 30. Specifically, the chip 2 is placed on any of the sub-areas of the banker pair area 31, the player pair area 32, the banker area 33, the player area 34, or the tie area 35. In addition, in a case of wanting to bet on a plurality of sub-areas, select a plurality of sub-areas is selected and the chip 2 is bet on each thereof.

When the chip 2 is bet on any of the sub-areas and it is determined that the bet acceptance is ended (S120: YES), the game progress management unit 210 changes the management information of the bet chip 2 to the bet state (S130). Specifically, the game progress management unit 210 reads the identification information of each betting area 30 and the identification information from the bet chip 2, and updates the history information associated with the identification information of the chip database 270 into the bet state. The game progress management unit 210 repeats the above-mentioned steps S110 and S120 as long as the betting period continues (S120: NO).

When the history of the bet chips 2 is changed (S130), the game progress management unit 210 is transited to the game period and executes the game process (S140). The dealer rolls up the cards in the player area 21 and the banker area 22 one by one according to the rules of baccarat. The game progress management unit 210 calculates the total points of the rolled cards and determines the win or loss of the game. That is, it is determined which sub-area is the winning area or the non-winning area.

Next, the game progress management unit 210 determines whether the user has bet the chip 2 in the winning area (S150). Then, in a case where the chip 2 has been bet in the winning area (S150: YES), the process proceeds to step S160. That is, the dividend amount calculation unit 220 calculates the dividend amount according to the win or loss of the game. The dealer places the chip 2A corresponding to the dividend amount on the winning area. The placement amount determination unit 230 determines the placement amount of the chip 2A placed on the winning area. The placement amount/dividend amount comparison unit 240 compares the placement amount with the dividend amount and determines whether the placement amount matches the dividend amount. As long as the placement amount does not match the dividend amount (S160: NO), it can be determined that the dealer is in the middle of the dividend, so the same determination/comparison is repeated.

If the placement amount matches the dividend amount (S160: YES), it can be determined that the dividend by the dealer has been completed, so that the management information updating unit 250 validates the status of the chip 2 bet in the winning area (S170). Specifically, the management information updating unit 250 rewrites the management information of the chip 2 bet by the user and the chip 2A distributed by the dealer, which are placed on the winning area, into the valid state through the recording device 130.

When the management information of the chip 2 and the chip 2A is rewritten into the valid state by winning, the update completion notification unit 260 notifies that the management information of the chip 2 and the chip 2A has been changed (S180), and ends the game. The notification that the management information has been changed to the valid state is performed, for example, by changing the emission color of the lamp 40 or displaying a message on the display unit 36 of the table surface 110.

On the other hand, in a case where the user has not bet the chip 2 on the winning area (S150: NO), the management information updating unit 250 updates the management information of the chip 2 bet on the non-winning area to the invalid state (S190). Specifically, the management information updating unit 250 rewrites the management information of the chip 2 bet in the non-winning area into the invalid state through the recording device 130.

Then, when the management information of the chip 2 is rewritten into the invalid state due to non-winning, the update completion notification unit 260 notifies that the management information of the chip 2 has been changed (S200), and ends the game. The notification that the management information has been changed to the invalid state may be performed by a method different from the above-mentioned notification that the management information has been changed to the valid state, for example, by blinking the lamp 40.

Hardware Configuration of Computer Device

Figure 7:
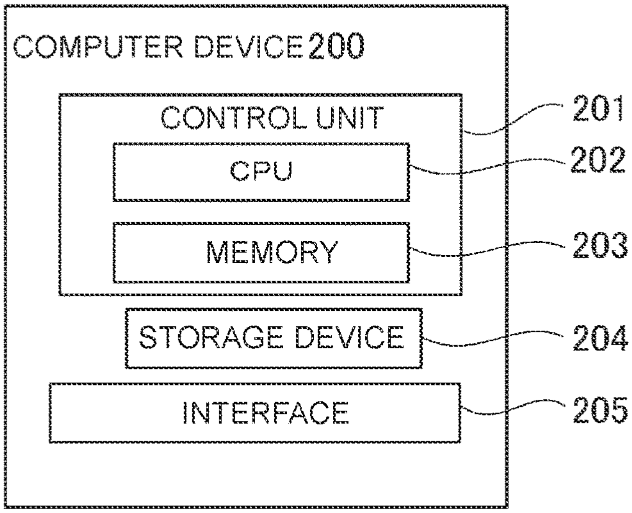
FIG. 7 is a block diagram illustrating an example of a hardware configuration of a computer device according to an embodiment.

FIG. 7 illustrates a hardware configuration of the computer device 200 according to the present embodiment. As illustrated in FIG. 7, the computer device 200 includes a configuration as a general-purpose computer including a control unit 201, a storage device 204, and an interface device 205. The control unit 201 includes a computer processing unit (CPU) 202 and a memory 203.

The CPU 202 is an arithmetic unit that executes a predetermined program one by one and exerts a predetermined function. The memory 203 is a temporary storage region such as a random access memory (RAM). The storage device 204 is a hard disk or other large-capacity storage medium, and stores a software program and necessary data related to the chip information management method according to the present embodiment. The interface device 205 is input/output means capable of transmitting/receiving data to/from the game table main body 100.

In the present embodiment, the CPU 202 transfers and executes the software program and data stored in the storage device 204 to the memory 203 to cause the computer device 200 to function as the game progress management unit 210, the dividend amount calculation unit 220, the placement amount determination unit 230, the placement amount/dividend amount comparison unit 240, the management information updating unit 250, and the update completion notification unit 260 which are functional blocks described with reference to FIG. 1.

Effects

As described above, the game table 10 according to the present embodiment executes the function of updating the management information so as to validate the status of the chips 2 installed in the betting area 30 that won the game during the dividend period in which the dividend amount according to the result of the game is paid, and invalidate the status of the other chips 2. Therefore, according to the game table 10 according to the embodiment, the chip 2 placed on the winning betting area 30 after the result of the game is determined is automatically validated or invalidated, so that the dealer does not have to take time and effort to validate the status of chip 2. In addition, it is possible to prevent an error that the dealer validates a chip that has to be the invalid state or invalidates a chip that has to be the valid state. Furthermore, since the conditions and timing at which the chip is validated are limited, an unauthorized use such as the user hiding the validated chip and cashing the validated chip can be suppressed.

Other Embodiments

The embodiments described above are for facilitating the understanding of the present disclosure, and are not for limiting the interpretation of the present disclosure. Each element included in the embodiments and the disposition, material, condition, shape, size thereof, and the like are not limited to those exemplified, and can be appropriately changed.

(1) In the above embodiments, the baccarat, which is a traditional card game, has been illustrated and described, but the present disclosure is not limited to this. For example, the present disclosure can be applied to game tables for playing other types of games such as blackjack. The present disclosure can be applied to update management of chip management information as long as the user plays the game by playing with chips in expectation of win or loss of the game.

(2) In the above embodiments, a stand-alone system in which one computer device 200 is disposed in the game table main body 100 is exemplified, but the present disclosure is not limited to this. For example, it may be configured as a star-type system in which a plurality of game table main bodies 100 is connected to the computer device 200 via an on-site network or a wide area network. In this case, the computer device 200 manages the game progress and the chip management information in the plurality of game table main bodies 100 as a host computer. The computer device 200 is configured to be able to manage not only the identification information of the betting area but also the identification information for specifying the game table.

Figure 8:
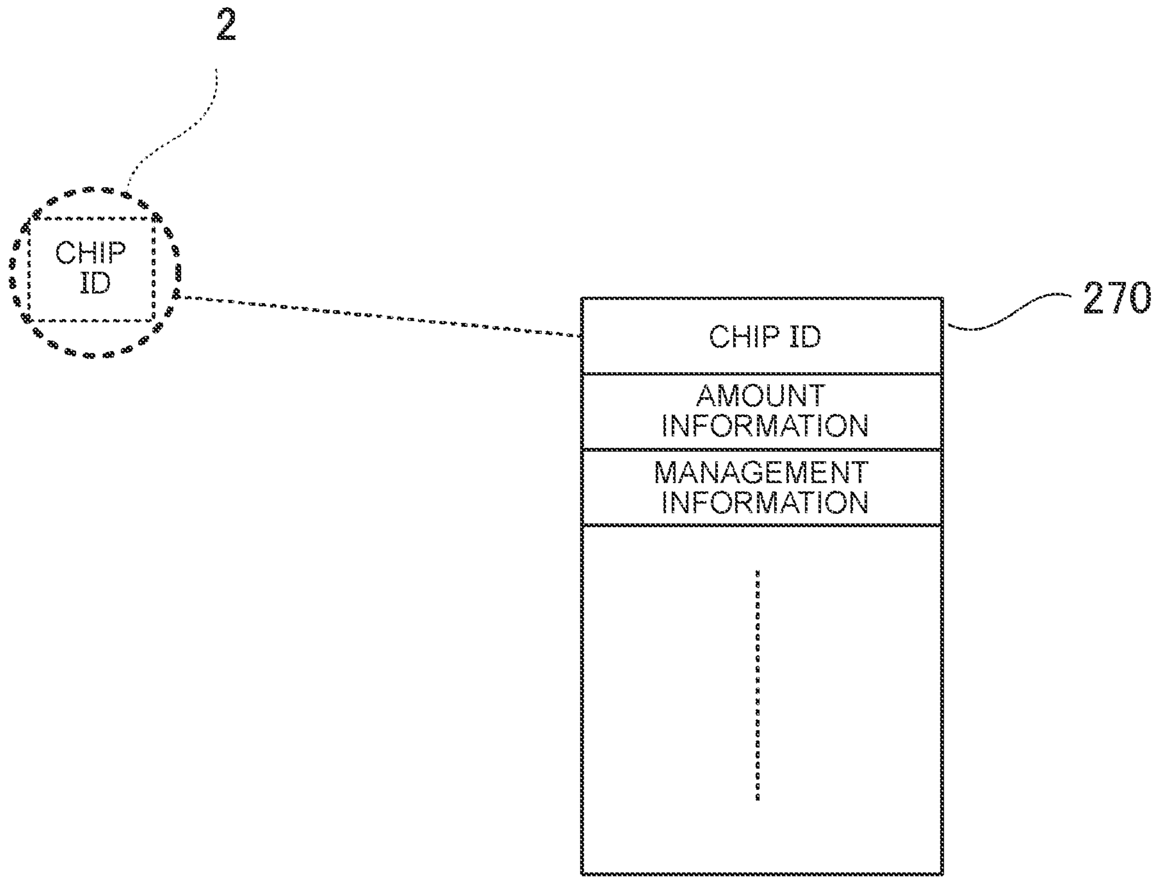
FIG. 8 is an explanatory view illustrating chip data and a hardware configuration according to another embodiment.

(3) In the above embodiments, a configuration in which the management information is updatable to be written to the chip 2 is illustrated, but the present disclosure is not limited to this. For example, it is conceivable that only the identification information is recorded in the chip 2, and the management information for managing whether the chip 2 is in the valid state or the invalid state is updatable to be managed in the chip database 270 in association with the identification information. For example, in the explanatory view illustrated in FIG. 8, the amount information and the management information (valid state, invalid state, and bet state) are stored and updated in the storage device (chip database 270) on the game table side in association with the identification information (chip ID) of the chip 2. Since it is not recorded in the chip 2 itself whether the chip 2 is in the valid state or the invalid state, it is more effective in suppressing fraudulent activities.

(4) In the above embodiments, the bet amount of the user and the dividend amount obtained as a result of winning are not particularly illustrated, but the present disclosure is not limited to this. For example, the display unit 36 may be configured to display the bet amount and the dividend amount.

(5) In the above embodiments, the notification that the chip management information has been changed is performed by the lamp 40 provided around the sub-area of the betting area 30, but the present disclosure is not limited to this. For example, the sub-area itself may be configured to be capable of emitting light, or a display device may be provided so as to perform the notification with image information or text information. Further, an acoustic device may be provided to add or substitute for notification by acoustic information.

(6) In the above embodiments, in a case where the placement amount does not match the dividend amount (S160: NO), it is determined that the dealer is in the middle of the dividend, but the present disclosure is not limited to this. For example, in a case where the placement amount does not match the dividend amount and more than a predetermined time has passed since the chip 2A corresponding to the dividend amount was placed, it may be determined that the chip 2A with a wrong dividend amount is placed. In this case, the update completion notification unit 260 may blink the lamp 40 or the like in order to notify that the dividend amount of the chip 2A placed on the winning area by the dealer is incorrect. Further, a display unit for displaying details of the effect thereof may be provided on the dealer side.

(7) In the above embodiments, the dealer handles the card deal, but the game progress may be automatically performed. That is, the dealer does not necessarily have to perform the game progress, such as displaying the game progress on the board provided with a liquid crystal display unit.

LIST OF REFERENCE NUMERALS

10 Game table
2 Chip
30 Betting area
100 Game table main body
110 Table surface
120 Reading device
130 Recording device
200 Computer device
210 Game progress management unit
220 Dividend amount calculation unit
230 Placement amount determination unit
240 Placement amount/dividend amount comparison unit
250 Management information updating unit
260 Update completion notification unit

What is claimed is:

1. A game table including a plurality of betting areas for placing chips, the game table comprising:
- a reading device that reads identification information that specifies the chip placed on the betting area; and
- a computer device that updates management information including a validity of the chip based on the identification information read from the chip,
- wherein the computer device executes
- a function of managing a progress of a game, and
- a function of updating the management information so as to validate a status of a chip placed on a betting area that won the game, and invalidate a status of the other chips during a dividend period in which a dividend amount according to a result of the game is paid.

2. The game table according to claim 1, wherein the computer device further executes a function of validating a status of a chip newly placed on the winning betting area during the dividend period.

3. The game table according to claim 2, wherein the computer device further executes a function of determining a placement amount of the chip placed on the winning betting area,
- a function of calculating a dividend amount according to win or loss of the game, and
- a function of comparing the placement amount with the dividend amount, and validating the status of the newly placed chip when the placement amount matches the dividend amount.

4. The game table according to claim 1, wherein the computer device further executes a function of notifying that the update of the management information is completed.

5. The game table according to claim 1, wherein the management information includes identification information of the game table, identification information of an area where a player bets, and status information indicating a status of the chip according to a progress of the game.

6. A chip information management method for a game table including a plurality of betting areas for placing chips, the method comprising:
- a step of reading identification information for specifying the chip placed on the betting area; and
- a step of updating management information including a validity of the chip based on the identification information read from the chip,
- wherein in the step of updating the management information, a function of updating the management information is executed so as to validate a status of a chip placed on a betting area that won a game, and invalidate a status of the other chips during a dividend period in which a dividend amount according to a result of the game is paid.

* * * * *